CIRCUIT ARRANGEMENT FOR TELEPHONE INSTRUMENTS

Filed June 21, 1962 2 Sheets-Sheet 1

INVENTOR
WILFRIED PAUL MARTIN SCHÜTZE
BY Hane and Nydick
ATTORNEYS

CIRCUIT ARRANGEMENT FOR TELEPHONE INSTRUMENTS

Filed June 21, 1962 2 Sheets-Sheet 2

INVENTOR
WILFRIED PAUL MARTIN SCHÜTZE
BY Hane and Nydick
ATTORNEYS

United States Patent Office 3,226,492 Patented Dec. 28, 1965

3,226,492

CIRCUIT ARRANGEMENT FOR TELEPHONE INSTRUMENTS

Wilfried Paul Martin Schütze, Hagersten, Sweden, assignor to Telefonaktiebolaget L M Ericsson, Stockholm, Sweden, a corporation of Sweden Filed June 21, 1962, Ser. No. 204,154
Claims priority, application Sweden, June 30, 1961, 6,814/61
5 Claims. (Cl. 179—170)

The invention refers to a circuit arrangement for telephone instruments, which are intended to be used with telephone circuit systems comprising four-wire circuits with amplifiers. In circuit systems of this kind in which the transmission time of the signal is long, an annoying echo can, as known, appear due to the fact that a part of the speech of the talking subscriber, which speech is transmitted over one of the two-wire lines of the four-wire circuit, is reflected through the other two-wire line (owing to incomplete matching between the instrument of the receiving subscriber and the line) back to the talking subscriber is audible to him as an annoying echo.

The magnitude of the echo, which can be tolerated in a circuit, depends on the time between speech and echo. If this time is long, as is the case with long trunk calls, only a weak echo can be tolerated. Thus, it is of importance for such calls that the echo level is kept low, but heretofore it has been found difficult to maintain a low echo level by simple means. The present invention refers to a simple circuit arrangement, which makes it possible to keep the echo on a low level. The invention is characterized thereby that all or some of the telephone instruments of the subscribers in the system are provided with impedance correcting network, which is of such a nature that the impedance of said corrective network together with the impedance of the instrument itself produces a resulting impedance, which is capacitive within the whole frequency band (300–3400 Hz.), or in any case within the part of the voice frequency band (500–2500 Hz.) of importance for the echo.

Figure 1:
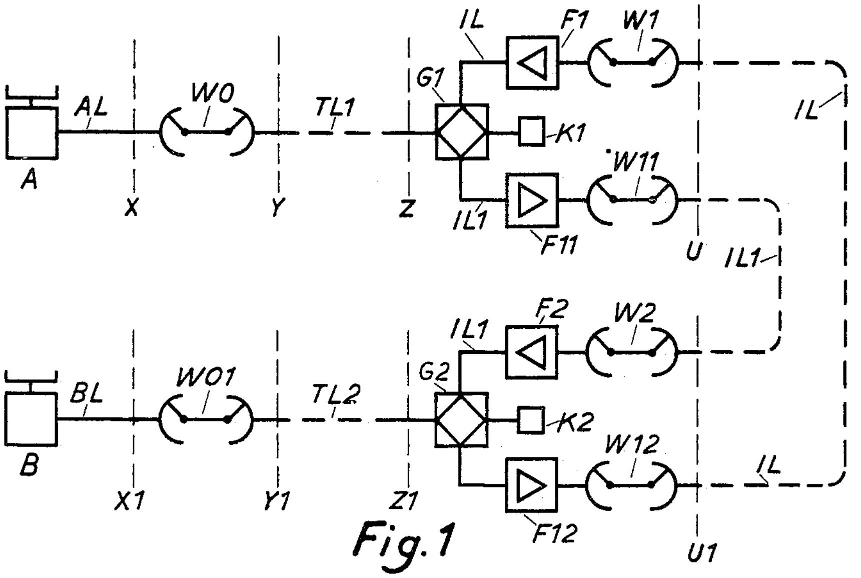
Figure 2:
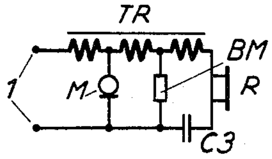
Figure 3:
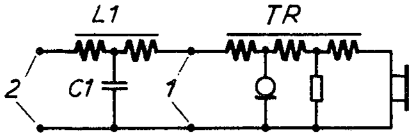
Figure 4:
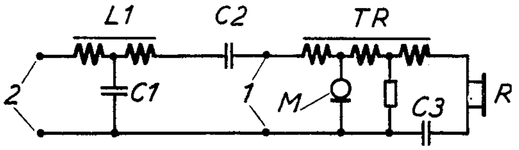
Figure 5:
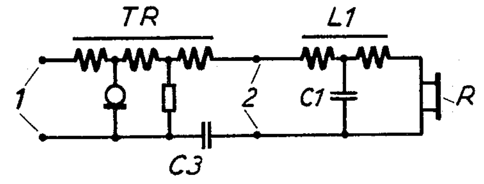
Figure 6:
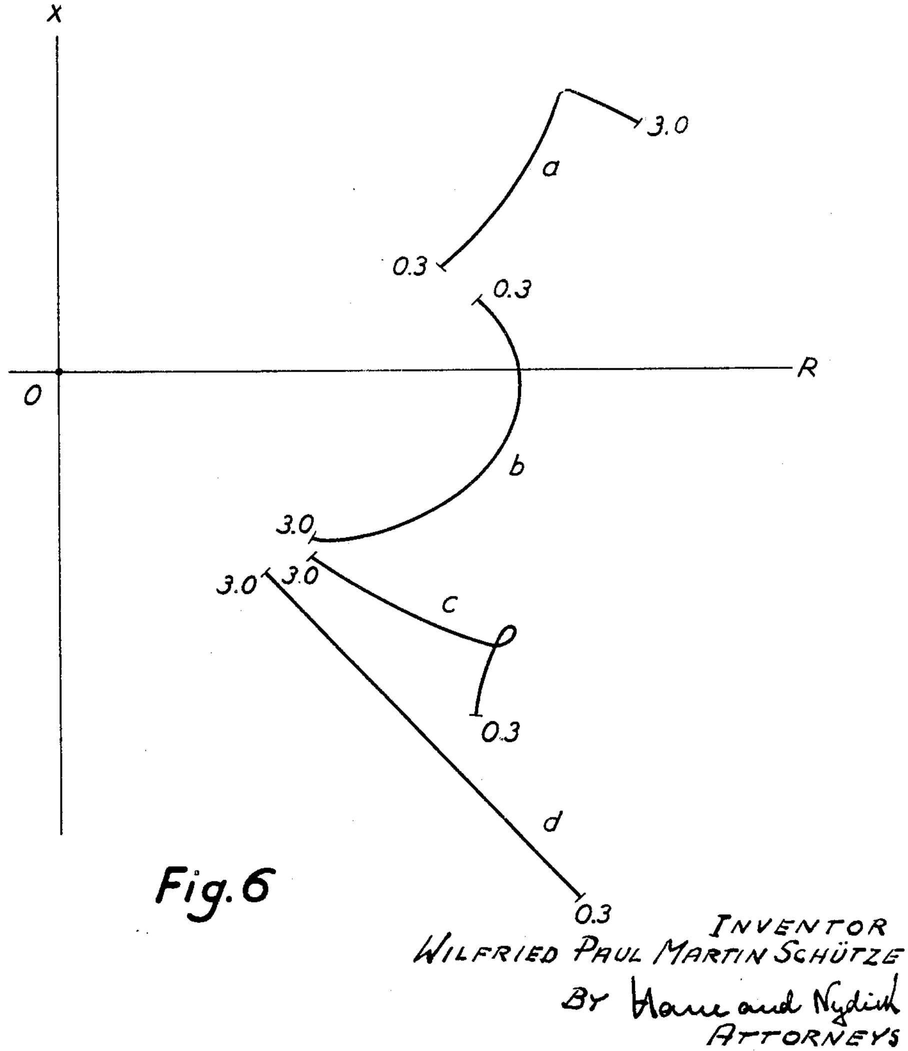

The invention will be further described with reference to the accompanying drawings, which show a number of fundamental embodiments. FIG. 1 is a circuit diagram, which shows a trunk connection. FIG. 2 is a circuit diagram for a subscriber instrument. FIGS. 3, 4 and 5 are circuit diagrams, which show the connection of a network according to the invention to a subscriber instrument. FIG. 6 shows graphs illustrating the effect of the corrective network.

FIG. 1 shows a subscriber A in a local exchange system and connected over a two-wire line AL to a local exchange WO indicated between the lines X, Y. The local exchange is connected through a trunk line TL1 to a trunk exchange indicated between the lines Z, U, in which in a known way G1 indicates the hybrid transformer, which changes the two-wire circuit TL1 into a four-wire trunk circuit IL, IL1, which via terminal amplifiers F1, F11 and possible selecting stages W1, W11 leads to another trunk exchange shown between the lines U1, Z1. This other exchange similar to the first-mentioned trunk exchange, comprises a hybid transformer G2, terminal amplifiers F2, F12, and selector stages W2, W12. K1 and K2 indicate balance impedances for the hybrid transformers G1 and G2. The lines IL and IL1 are two-wired, and the trunk exchange situated between the lines U1, Z1 is via the trunk line TL2 connected with the local exchange WO1 indicated between the lines X1, Y1, to which local exchange, among others, the subscriber B is connected. When the subscriber A speaks, the speech is transmitted via the local exchange WO, the trunk line TL1, the trunk line IL1, the terminal amplifier F11 to the other trunk exchange through the terminal amplifier F2, the transformer G2, the trunk line TL2, and the local exchange WO1 to the subscriber B. The impedance of a telephone instrument is complex and has, owing to the component sincluded and their connection an inductive imaginary part within the voice frequency band 300–3400 Hz., while the line (AL, TL1 respectively BL, TL1) connected to the instrument has a capacitive imaginary part.

A considerable reflection will therefore occur in the connection point between line and the instrument B, and the reflected part of the speech travels via BL, WO1, TL2, G2, F12, W12, IL, W1, F1, G1, TL1, WO to A and is received by A as an annoying echo. According to the invention this echo can be considerably reduced by means of an impedance correcting network, which is connected to the instrument B in such a way that the resulting impedance (instrument+network) obtains an impedance, which is capacitive within a considerable part of the frequency band. The reflection in the connection point between instrument and line, and thus also the echo, will hereby be considerably less. In case the network is formed so that the resulting instrument impedance is equal to the image impedance for the line connected to the instrument, no reflection will appear and the echo will be equal to zero.

If the echo level, in a telephone circuit of a certain given length has been lowered by means of the invention to a value, which is below the value which is tolerated for a circuit of the length in question, the amplification in the terminal amplifiers F2 and F12 can be increased to such an extent that the echo level increases to the tolerated value. Such increased amplification leads to a better quality of the speech for the subscribers. The speech quality, which existed before the amplification was increased, may also be maintained and instead the increase of the amplification can be compensated by increasing the attenuation in the line BL+TL2, that is the telephone system can be made with a smaller gauge, whereby an economic profit is obtained. Sometimes in old systems the attenuation is too high in certain parts of the system. If the echo in such systems is on a level, which does not allow an increase of the amplification—since the echo increases with increasing amplification—a decrease of the echo level can be obtained by using correction networks for the instruments according to the invention, which decrease in turn allows an increase of the amplification, that is a decrease of the attenuation in the system.

In FIG. 2 the circuit diagram of a telephone instrument is shown. 1 indicates the instrument terminals, TR the speech transformer, M and R the transmitter or microphone respectively the receiver, respectively, BM a balance resistance, C3 a blocking condenser. In FIG. 3 a correcting-network in the form of an all-pass phase-shifting network including an inductance L1 and a condenser C1 is connected to the instrument terminals 1. The inductance has a ferro magnetic core. 2 indicates the line terminals of the instrument. In FIG. 4 the correcting-network L1, C1 is shown as further comprising a series condenser C2. In FIGS. 3 and 4 the correcting-network L1, C1 is connected ahead of (seen from the line) the speech transformer TR of the instrument. In FIG. 5 a circuit is shown, in which the network L1, C1 is connected between the speech transformer TR and the receiver R. The condenser C3, which is a part of the instrument circuit and arranged for blocking the direct current through the receiver, can also serve as a series condenser in the correcting network.

The graphs of FIG. 6, show the effect of the correcting-network upon the instrument impedance. The different graphs are locus diagrams for the impedance and show the variation of the impedance with the frequency.

The value on abscissa R indicates the resistive value of the impedance and the value on the ordinate X the imaginary reactance value. The graph *a* is valid for the instrument impedance without network and shows an inductive impedance, which increases with the frequency. The digits at the graphs indicate the frequency in kHz. The graph *d* is valid for the image impedance of the line (AL+TL1 respectively BL+TL2) and shows a capacitive impedance which decreases with the frequency. The graph *b* is the locus diagram for the resulting impedance composed of the impedance of the instrument itself and of the correcting-network according to FIG. 3. As appears this locus diagram is with its greatest part within the capacitive quadrant. Owing to this, considerably less reflection and echo appear if the line, whose image impedance varies according to curve *d*, is connected to an instrument, whose impedance varies according to curve *b*, than if the same line is connected to an instrument impedance according to curve *a*, the latter, of course, being inductive. A further decrease of the effects of reflection and echo is obtained when using the network shown in FIGS. 4 respectively 5 and which also comprises a series condenser C2 respectively C3. In FIG. 4 the condenser C2, included in the network, blocks the feeding of direct current to the microphone M. In such an arrangement, the microphone must be of a type, which does not require feeding of direct current, for example an electrodynamic one.

The locus diagram for the resulting impedance, which is composed by the instrument and said network, FIG. 4 or 5, is the graph *c*. As appears this graph has capacitive values along its whole length and, during about half its frequency form, it shows a good conformity with the course of the locus diagram *d* for the image impedance of the line.

The correcting network can be designed in a number of different ways, the one shown on the drawing being only one example. The correcting-network L1, C1 can also be formed so that one or more windings of the speech transformer TR, besides its normal function, at the same time serves as inductance L1 in the all-pass phase shifting network L1, C1.

It is, of course, also possible to design the correcting-network so that the locus diagram of the resulting instrument-impedance mainly coincides with the locus diagram of the image impedance of the line. In this case reflection and echo effect will be insignificant. However, it is not necessary that the curves coincide, since a certain echo is tolerated.

The trunk lines IL, IL1 between the two trunk exchanges U, Z and U1, Z1 may as usual comprise a number of amplifiers.

In the diagram shown in FIG. 1 K1 and K2, being provided in the two trunk exchanges, indicate line balances in the hybrid transformer G1 respectively G2. K1 respectively K2 are generally so dimensioned that the impedance for each of them is equal to the image impedance of the line which is connected to the hybrid transformer G1 respectively G2. The balance K1 respectively K2, which is a compromise-balance, is thus capacitive, and if a network according to the invention is not used, the impedance of the subscriber instrument will be inductive, and if the line between for example the subscriber A and G1 is very short, the resulting impedance for instrument and line will be inductive and does not match well the capacitive balance K1. If instead, according to the invention, the resulting instrument- impedance is capacitive and possibly equal to the image impedance of the line, a better balance between line and balance is obtained, and the disadvantages appearing owing to insufficient balance, that is feed back, is decreased.

I claim:

1. A telephone system comprising, in combination, a two-wire line, a four-wire line, a local exchange connected to said four-wire line, a telephone instrument connected to said exchange through said two-wire line, said instrument including a transmitter, a receiver and a speech transformer, and a corrective all-pass filter network including a capacitance and an inductance connected to said instrument to increase the attenuation thereof in respect to a signal received by the instrument from said four-wire line.

2. A telephone system comprising, in combination, a two-wire line, a four-wire line, a local exchange connected to said four-wire line, a telephone instrument connected to said exchange through said two-wire line, said instrument including two inputs, a transmitter, a receiver and a speech transformer, a corrective all-pass filter network including a capacitance and an inductance, and a capacitance means serially connected with said filter network to increase the attenuation of said instrument in respect to a signal received by the instrument from said four-wire line

3. A telephone system according to claim 2 wherein said corrective network is connected between said inputs and said speech transformer of the telephone instrument.

4. A telephone system according to claim 2 wherein said corrective network is connected between said speech transformer and said receiver of the telephone instrument.

5. A telephone system according to claim 2 wherein said corrective network is a phase-shifting network.

References Cited by the Examiner

UNITED STATES PATENTS

| | | | |
|---|---|---|---|
| 1,625,840 | 4/1927 | Whittle | 333—32 |
| 1,628,983 | 5/1927 | Johnson | 333—32 |
| 2,957,944 | 10/1960 | De Monte | 333—32 |

OTHER REFERENCES

Electrical Transmission of Power and Signals: Kimbark, 1949, Wiley, pages 221–226.

ROBERT H. ROSE, *Primary Examiner.*